T. ROUSE.
ROTARY HARROWS.
No. 179,427.
Patented July 4, 1876.
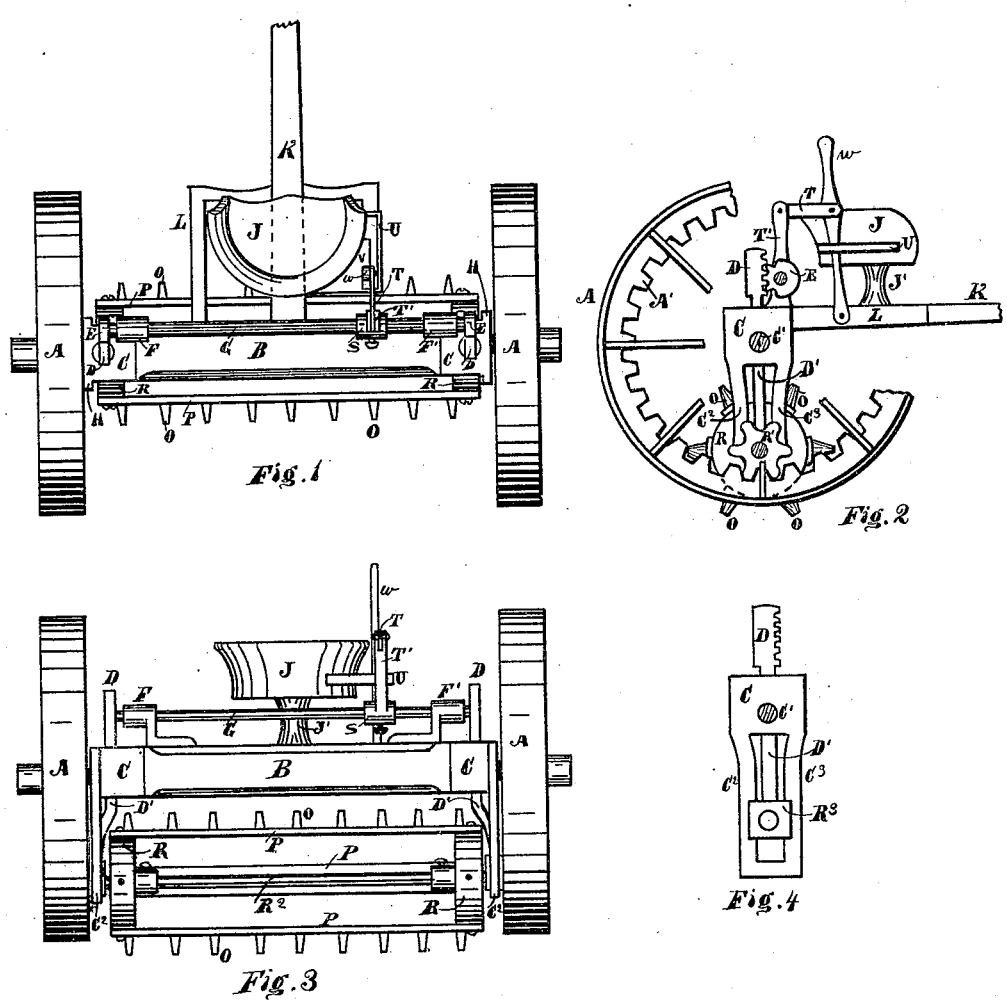

UNITED STATES PATENT OFFICE.

THOMAS ROUSE, OF INDIANAPOLIS, INDIANA.

IMPROVEMENT IN ROTARY HARROWS.

Specification forming part of Letters Patent No. 179,427, dated July 4, 1876; application filed January 21, 1876.

*To all whom it may concern:*

Be it known that I, THOMAS ROUSE, of Indianapolis, county of Marion, State of Indiana, have invented a new and useful Improvement in Rotary Harrows, of which the following is a description, reference being had to the accompanying drawings.

My invention consists of the construction and arrangement of a rotary-harrow cylinder and its connections with the vehicle, whereby I am enabled to throw it into gear and out of gear when required. By this arrangement I am enabled to transport the machine from one place to another without allowing the harrow-teeth to come in contact with the ground or the cylinder to revolve, and when in operation the cylinder is dropped, thus allowing the harrow-teeth to enter the soil and to be held in contact therewith by the weight of the vehicle and operator.

Figure 1 represents a plan view of my improved rotary harrow. Fig. 2 is an end view of the same, with the side wheel partially in section, to show more fully the working parts. Fig. 3 is a rear elevation of the harrow and vehicle. Fig. 4 is an elevation of the hanger slide or harrow-cylinder support.

A A represent the wheels of the vehicle, mounted on the axle B. K is the tongue or pole, on which, near the axle B, is mounted the seat J on the standard J'. L represents a frame-work or hounds designed to strengthen the connections of the tongue and axle, and also to act as a support for the feet of the operator. On each end of the axle B are secured the harrow-hangers C, which are provided with the spindles $C^1$ for the wheels A. The projections $C^2$, which extend downward, as shown in Figs. 3 and 4, are formed with two sides, $C^2$ $C^3$, parallel with each other, and forming guides in which the box $R^3$ is operated by means of the rack-rod D D' and pinion E, as shown in Figs. 2 and 3, which will be more fully described hereafter.

The boxes $R^3$ are designed to support the cylinder P R $R^2$ and allow the cylinder to revolve in them, as shown in Figs. 2 and 3.

The harrow-cylinder is composed of the shaft $R^2$, which extends the whole length of the cylinder, with journals to operate in the hanger-boxes $R^3$, and is provided at each end with pinions $R^1$ that operate in the master-wheel A', which is secured to the inside of vehicle-wheel A. On the shaft $R^2$, near each journal, are secured the heads R R in any manner, and on these heads are secured the metallic bars P with the harrow-teeth O either cast thereon or bolted through holes properly formed, as shown in Fig. 3.

Above the axle B, parallel therewith, and supported by the boxes F F', is the shaft G, at each end of which is secured the pinions E, which mesh in gear with the rack-rods D D'. (Shown more fully in Figs. 2 and 3.) On the shaft G is also secured a projecting arm, S T, the upper end of which has a fork, in which is pivoted one end of the rod T. The other end of the rod T is pivoted to the lever $w$, as shown in Fig. 2. The lower end of the lever $w$ is also pivoted to the frame L, and the lever $w$ operates in a notched recess formed in the projecting side rack U that is attached to the side of the seat J. (Shown more fully in Fig. 1.)

Having thus described the manner of construction of the several parts embraced in my invention I will now describe its mode of operation.

The revolving harrow being placed in the hangers, as shown in Figs. 1, 2, and 3, the operator takes his seat, and while going from one place to another, as in moving the machine from one field to another, &c., he throws the lever $w$ forward and secures it in the front notch V of the projecting side rack U. This movement of the lever causes the arm T to move forward, which communicates motion to pinions E E and raises the rack-rods D D', which in turn lift the harrow-cylinder by means of the boxes $R^3$ operating in the hangers C $C^2$ $C^3$, and while in this position the pinions $R^1$ at each end of the harrow-cylinder are moved up out of gear with the master-wheels A', and the cylinder is held suspended with the teeth O all above the ground. When in use the lever $w$ is removed from the notch V and the harrow-cylinder is lowered to the ground, when the pinions $R^1$ at each end of the cylinder is brought into contact with the master-wheels A' and firmly secured there, and prevented from working out by means of the lever *w*, which is secured in another notch at the rear of notch V in the side rack U.

By this arrangement I am enabled to use a cylinder-harrow of much less weight than usual, because I get the additional weight of the vehicle and operator to help hold the harrow-teeth in the soil. The pinions $R^1$ on the ends of the harrow-cylinder may be made of any size necessary to give the required increase of speed to the cylinder over the master-wheels.

What I claim as new, and wish to secure by Letters Patent, is—

1. In a rotary harrow, the combination of the master-wheels $A'$, pinions $R^1$, shaft $R^2$, harrow-heads R R, and harrow-bars P, arranged to be revolved in the adjustable boxes $R^3$, secured in the hangers C $C^2$ $C^3$ in the manner shown, for the purposes set forth and described.

2. In combination with the adjustable boxes $R^3$ and hangers C the lifting-rods D D, provided at their upper ends with a rack which engages with the pinions E E that are operated by means of the lever *w*, in the manner shown, for the purposes set forth and described.

In testimony whereof I have signed my name to this specification in the presence of two subscribing witnesses.

THOMAS ROUSE.

Witnesses:
E. O. FRINK,
GEORGE SMITH.